(12) United States Patent
Anderton et al.

(10) Patent No.: US 7,495,219 B2
(45) Date of Patent: Feb. 24, 2009

(54) RADIATION DETECTION APPARATUS

(75) Inventors: Rupert N Anderton, Malvern (GB);
Peter R Coward, Malvern (GB); Sean Price, Malvern (GB)

(73) Assignee: QinetiQ Limited, London (GB)

( * ) Notice: Subject to any disclaimer, the term of this patent is extended or adjusted under 35 U.S.C. 154(b) by 207 days.

(21) Appl. No.: 10/560,071

(22) PCT Filed: Jun. 11, 2004

(86) PCT No.: PCT/GB2004/002520
§ 371 (c)(1),
(2), (4) Date: Dec. 9, 2005

(87) PCT Pub. No.: WO2004/111584
PCT Pub. Date: Dec. 23, 2004

(65) Prior Publication Data
US 2006/0126187 A1    Jun. 15, 2006

(30) Foreign Application Priority Data
Jun. 12, 2003  (GB) ............... 0313573.8

(51) Int. Cl.
*G01J 1/00* (2006.01)
*G01J 4/00* (2006.01)
(52) U.S. Cl. ............ 250/338.1; 250/332; 250/353; 342/53; 350/352
(58) Field of Classification Search ............ None
See application file for complete search history.

(56) References Cited

U.S. PATENT DOCUMENTS

| | | | | |
|---|---|---|---|---|
| 4,224,626 A | * | 9/1980 | Sternberg | 343/911 R |
| 4,482,513 A | * | 11/1984 | Auletti | 264/39 |
| 4,515,443 A | * | 5/1985 | Bly | 359/246 |
| 6,091,548 A | | 7/2000 | Chen | |
| 6,587,246 B1 | * | 7/2003 | Anderton et al. | 359/212 |
| 6,876,784 B2 | * | 4/2005 | Nikolov et al. | 385/11 |
| 2001/0028436 A1 | | 10/2001 | Balch et al. | |

FOREIGN PATENT DOCUMENTS

| | | |
|---|---|---|
| EP | 1 077 386 | 2/2001 |
| EP | 1 345 043 | 9/2003 |
| GB | 2 279 179 | 12/1994 |
| JP | 02-131603 | 5/1990 |
| WO | 00/14587 | 3/2000 |
| WO | 01/99229 | 12/2001 |

OTHER PUBLICATIONS

Silver, Samuel, Microwave Antenna Theory and Design, 1997, British Library Publication Data, pp. 388-391.*
"Aberrations" http://physics.tamuk.edu/~suson/html/4323/aberatn.html, Jul. 24, 1997.*
International Search Report for PCT/GB2004/002520 dated Dec. 10, 2004.
UK Search Report for GB 0313573.8 dated Oct. 20, 2003.

* cited by examiner

*Primary Examiner*—David P Porta
*Assistant Examiner*—Yara B Green
(74) *Attorney, Agent, or Firm*—Nixon & Vanderhye P.C.

(57) ABSTRACT

A radiation detection apparatus comprises a radiation detector and a lens arrangement. The lens arrangement comprises a polarising element and an optical corrector. The optical corrector is preferably located between the polarising element and the radiation detector and has at least one surface designed to correct optical aberrations present in the lens arrangement. The optical corrector may be arranged to provide a mechanical support to the polarising element. The optical corrector is arranged to increase a diffraction limited acceptance angle of the apparatus.

11 Claims, 4 Drawing Sheets

RADIATION DETECTION APPARATUS

This application is the U.S. national phase of international application PCT/GB2004/002520 filed 11 Jun. 2004 which designated the U.S. and claims benefit of GB 0313573.8, dated 12 Jun. 2003, the entire contents of each of which are hereby incorporated by reference.

This invention relates to radiation detection apparatus. More particularly, but not exclusively, it relates to radiation detection apparatus for millimeter wavelength radiation, microwave radiation and/or terahertz frequency radiation.

The use of metallic wire polarising grid mirrors as focusing elements in millimeter wavelength imaging systems is known, see for example our co-pending PCT national phase U.S. patent application Ser. No. 10/467,798. Referring now to FIG. 1, a millimeter wavelength imaging system 100 of the prior art comprises a curved polarising grid 102 which allows radiation 104 of a specific polarisation to pass therethrough whilst reflecting radiation of other polarisations. A small portion, typically <10%, of the radiation 104a is incident upon feed horn apertures 106 of a receiver array 108. However, this small portion of the radiation is wasted as it is unfocused and of the wrong polarisation to be received. The remainder of the radiation 104b passes through a polarisation twisting device 107, typically a quarter wave plate or Ferrite, and is reflected from an aspherical rotating mirror 110. The grid 102 reflects radiation of polarisation twisted by 90° 104c to a focal point at the position of the feed horn apertures 106.

However such systems whilst satisfactory for long distance viewing do not provide a wide enough field of view at a short enough range to provide diffraction limited images in certain applications, for example, screening of articulated lorries for people, in a single operation.

The size of an imaging system is typically defined by the free-space radiation wavelength used, typically around 1 mm to 10 mm, with 3 mm and 10 mm being particularly suitable due to the presence there of atmospheric absorption windows, the required resolution, spot size and the operating range.

Array elements are an integral and expensive part of any millimeter wavelength imaging system and increasing either the size or the number of the array elements contributes significantly to the cost of such an imaging system. The number of array elements required is proportional to the field of view of the system, and inversely proportional to the spot size.

According to the present invention there is provided a radiation detection apparatus comprising a radiation detector and a lens arrangement, the lens arrangement comprising a polarising element and an optical corrector, the polarising element being arranged to selectively transmit radiation of a first polarisation and to selectively reflect radiation of a second polarisation, and the optical corrector having a first and a second surface, where at least one of the first and second surfaces is shaped to correct aberrations present in the lens arrangement.

The optical corrector may be arranged to increase the diffraction limited input acceptance angle of the apparatus. The method of design of the shape of the corrector to correct for aberrations and to increase the system input acceptance angle would be known to the normally skilled person, and will not be described further herein.

This apparatus has the advantage over the prior art that the increased acceptance angle of the apparatus results in a wider field of view at a shorter range (i.e. apparatus to subject distance) due to the appropriately shaped surface of the optical corrector. Use of the apparatus at short ranges, typically from 1 m to about 10 m, allows either a higher resolution to be achieved or smaller optics to be used, although it will be appreciated that this apparatus will have advantages at ranges in excess of 10 m. This results in the ability to screen large objects, for example lorries or people, in a single pass with high resolution thereby increasing the throughput rate of the apparatus.

The optical corrector may preferably be arranged to be a mechanical support for the polarising element, typically upon the corrector's front surface, although the rear surface may alternatively be used to support the polarising element. In this manner the supporting surface thereof is conformal to the required shape of the polarising element. The polarising element may be a wire grid, which may comprise a plurality of substantially parallel metallic wires. The polarising element may be arranged to selectively transmit radiation of a first polarisation and to selectively reflect radiation of a second polarisation. The radiation reflected by the polarising element may be focused by the polarising element. A curvature, which may be spherical or aspherical, may be applied to the shape of the polarising element to effect the focusing of the polarising element.

The non-planar non-supporting surface of the optical corrector may be aspherical or spherical. In this specification the term "aspherical" should be taken to mean a deviation from the spherical, for the purposes of alteration of optical characteristics. Use of the non-supporting surface of the optical corrector to correct for aberrations present in the lens arrangement, and particularly in a curved surface of the focusing polariser, allows a stronger curvature to be employed, and so facilitate a wider field of view of the optical system.

The support of the polarising element by the optical corrector results in a compact apparatus and maintains the polarising element in the desired optical profile to focus reflected radiation.

The optical corrector may be fabricated from a plastics material, for example polyethene. The material may be a plastics foam material, typically expanded polystyrene. Preferably the optical corrector is fabricated from a material having a density of around 30 gl$^{-1}$. The optical corrector may be fabricated from a material having a refractive index of between 1.001 and 2, but this refractive index may possibly extent as high as 10, or beyond. Preferably the material has a refractive index of about 1.0178.

The use of a plastics foam material in the formation of the optical corrector allows a lightweight optical corrector to be fabricated.

There may be provided a further optical corrector interposed between the optical corrector and the radiation detector. The further optical corrector may have a front surface with an elliptical or rectangular cross-section (i.e. the front view) and an aspherical, plane or spherical profile. It is preferred to have an elliptical cross-section in order to minimise obscuration of the incoming beam. The further optical corrector may have a rear surface with a different profile to the profile of the front surface.

The further optical corrector may be arranged to further increase the diffraction limited acceptance angle of the radiation detector.

The further optical corrector may be fabricated from a plastic material, for example polyethene. The material may be a plastic foam material, typically expanded polystyrene, or a solid plastics material. The material may have a refractive index of between 1.001 and 2, in a preferred embodiment the material has a refractive index of between 1.4 and 2. Alternatively, the material may have a refractive index of 2 or more.

The radiation detector may be an imaging radiation detector and may comprise an array of detection elements. The apparatus may comprise a mirror, which may be plane, spherical or aspherical. The radiation detector may be interposed between the optical corrector and the mirror. The mirror may be arranged to rotate and may be arranged to reflect radiation that has passed through the polarising element and optical corrector. The polarising element may be arranged to focus radiation, of a polarisation orthogonal to the polarisation that passed through it previously, onto the detector.

The radiation detection apparatus may be arranged to detect millimeter wavelength radiation.

The invention will now be described, by way of example only, with reference to the accompanying drawings in which:

FIG. 1 diagrammatically illustrates a millimeter wavelength radiation imaging apparatus of the prior art;

FIG. 2 diagrammatically illustrates a first embodiment of a radiation detection apparatus according to the present invention;

FIG. 3 diagrammatically illustrates a second embodiment of a radiation detection apparatus according to the present invention; and FIGS. 4a to 4e are two dimensional plots of simulated point spread functions of a radiation detection apparatus of the present invention, having a full field of 1920 mm×3840 mm (2:1 aspect ratio) at 6.31 m range and a radiation wavelength of 9 mm, along with their corresponding three dimensional plots.

Referring now to FIG. 2 a real time passive scanning millimeter wave imaging radiometer 200 has a scanner 202, a focusing lens arrangement 204, and an antenna feed array 206 which is linked to a detector 210, typically, by waveguides.

The scanner 202 comprises a flat or slightly curved reflector plate (mirror) 212, which is rotatably mounted about an axis 214, and inclined at an angle θ of approximately 3.75° to the normal to the axis 214. The focusing lens arrangement 204 comprises a focusing dish 218 and an optical corrector 222. The optical corrector 222 also acts as a mechanical support for the focusing dish 218 The dish 218 comprises a polarisation selective reflector element 220 (e.g. a wire grid) mounted upon a front surface 222a of the optical corrector/support 222. A quarter wave plate 216, typically a meanderline structure, lies in the optical path between the focusing lens arrangement 204 and the detector 210 behind the feed array 206, but is not located physically between the corrector 222 and the feed array 206.

The corrector/support 222 has non-planar, aspherical front and rear surfaces 222a,b and acts as an optical corrector. The support 222 is typically made from a plastics material, for example a plastics foam material such as expanded polystyrene, which is usually transparent to radiation being detected. A high density plastic foam material with a density of about 30 gl$^{-1}$ can be used to form the corrector/support 222. Alternatively, polyethene can be used to form the corrector/support 222. Typical refractive indices of materials used for the corrector/support 222 are in the range between 1.001 and 1.52; for example, a 30 gl$^{-1}$ polystyrene foam has a refractive index of 1.0178. The front surface of the corrector/support 222 is shaped so as to have a curvature that matches that required by the polarising reflector 220. Thus the polarising reflector may be positioned directly upon the front surface of the corrector/support 222. The rear surface 222b is not constrained by the shape of the polarising reflector, and so may be formed as appropriate to correct aberrations in the lens arrangement 204.

The corrector/support 222 provides extra aberration correction for radiation received from a wide field of view.

Incident radiation 225a is linearly polarised by the polarising reflector element 220, which typically has wires inclined at 90° or 0° to the vertical so that the component of radiation with a plane of polarisation, defined by the electric vector, 0° or 90° to the vertical (90° from the line of the wires in the grid) is transmitted through the support 222. This linearly polarised radiation, referenced 225b, encounters the meanderline plate 216. The plate 216 has the fast and slow axes of the meanderlines inclined at 45° to the direction of the wires on the reflector element 220 (and hence to the polarisation of the radiation 225b). Radiation 225c, emerging from the meanderline plate 216 is circularly polarised and is reflected from reflector plate 212 as radiation 225d, which is circularly polarised in the opposite sense to radiation 225c. When radiation 225d encounters the meanderline plate 216 it is converted back to linearly polarised radiation, radiation 225e, which has its plane of polarisation rotated by 90° in comparison with radiation 225b. When radiation 225e encounters the reflecting element 220 of the focusing dish 218 it is reflected and focused onto the feed array 206.

An inclination of the reflector plate 212 by θ gives the antenna a scan angle of 4θ.

The antenna feed array 206 typically has rows of horns, or other type of feed element. Each horn is connected to a detection channel, typically by a waveguide. A single detector element observes a circular scan pattern in a scene as the plate 212 rotates.

The output of each horn is fed to an amplifier, which outputs to a detector. Following a digitisation of the output of the detector, the digitised signals are sent to a microprocessor which processes these signals to produce an image that is displayed on a display.

This optical arrangement is a so-called conical scanning system. It is particularly compact for a specified aperture and field of view of the system.

Referring now to FIG. 3, a second embodiment of a radiation detection apparatus according to the present invention is substantially similar to the first embodiment described hereinbefore with reference to FIG. 2, and accordingly similar parts will be accorded similar reference numerals in the three hundred series.

A further optical corrector 350 is placed between corrector/support 322 and antenna feed array 306. The further optical corrector 350 is typically 150% of the width of the feed array 306, although it will be understood that this size will be governed by the relative position of the further optical corrector 350 with respect to the other optical components, and the system field of view, and will be preferably arranged such that all focused radiation passes through the further optical corrector 350. In a preferred embodiment, the further optical corrector 350 is very close to (typically within around 30 mm), and could even be in contact with, the detector 210 as this allows the size of the further optical corrector 350 to be minimised thereby minimising obscuration of the incoming radiation. The further optical corrector 350 has an elliptical or rectangular cross-section with an aspherically profiled front face 350a and a rear face 350b of aspherical or planar profile, although either face may have an asphericlly, spherically, or planar face as desired for a given optical design. Typically the profile on each surface will be different.

The optical corrector 350 provides still further aberration correction, and thereby allowing a further increase in the field of view over the over that for the embodiment described in relation to FIG. 2. The optical corrector 350 is typically made from a plastics material, for example a plastics foam material such as expanded polystyrene, which is usually transparent to radiation being detected. A high density plastic foam material with a density of about 30 gl$^{-1}$ can be used to form the optical corrector 350. Alternatively, polyethene can be used to form the optical corrector 350. Typical refractive indices of materials used for the optical corrector 350 are in the range between 1.4 and 2, but may also extend to greater than 2, Referring now to FIGS. 4a to 4e, point spread functions are a measure of the response of a system to a fixed point source within the field of view of an imaging apparatus. In an ideal apparatus the point spread function is a δ-function with a normalised intensity of 1, clearly this is not possible in real apparatus as the imaging apparatus is diffraction limited and the point spread function approximately exhibits a $sinc^2\ \theta$ dependency for an apparatus with ideal feeds. However, the feeds tapered response patterns and the response of the apparatus will be somewhere between the above dependency and Gaussian.

An optical apparatus having a normalised intensity point spread function (the so-called Strehl Intensity Ratio) peaking in excess of 0.8 is considered to be indicative of the imaging apparatus having good optical quality, with 1.0 being an aberration free system. Such a system is also termed "diffraction limited".

The graphs of FIG. 4 show point spread function results taken from a simulation of the optical system of a radiation detection apparatus according to the present invention.

Figure 1:
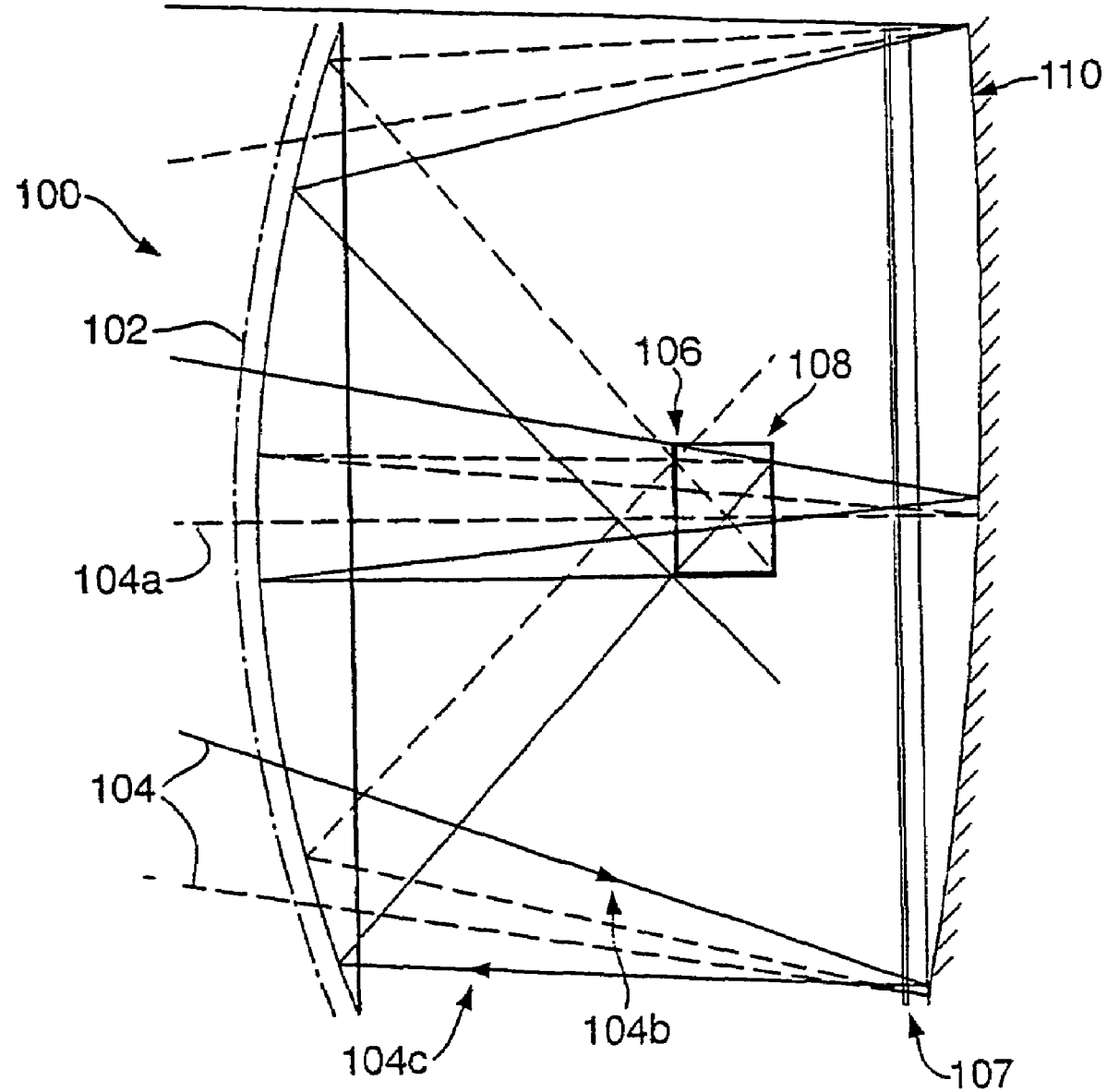
Figure 2:
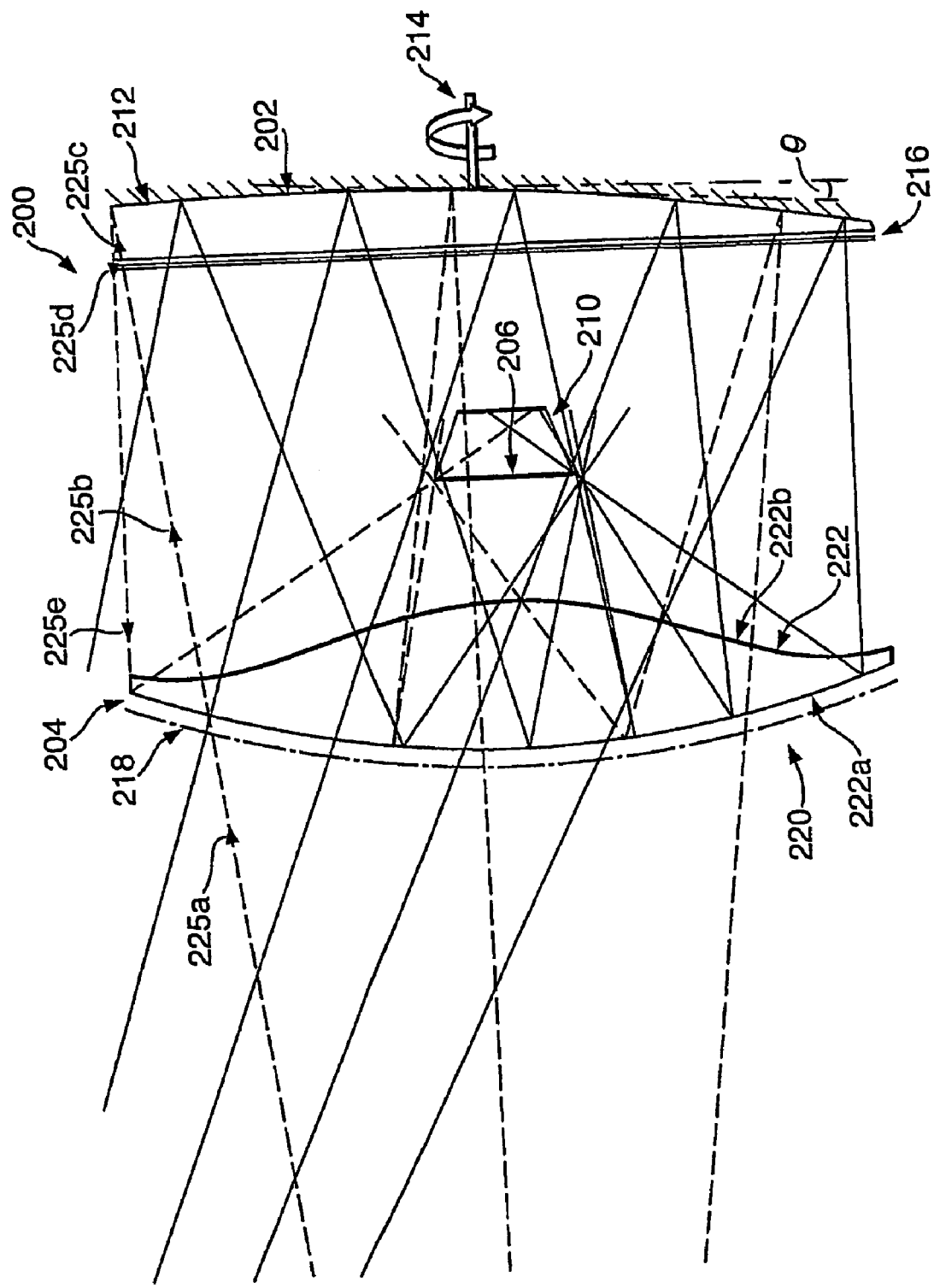
Figure 3:
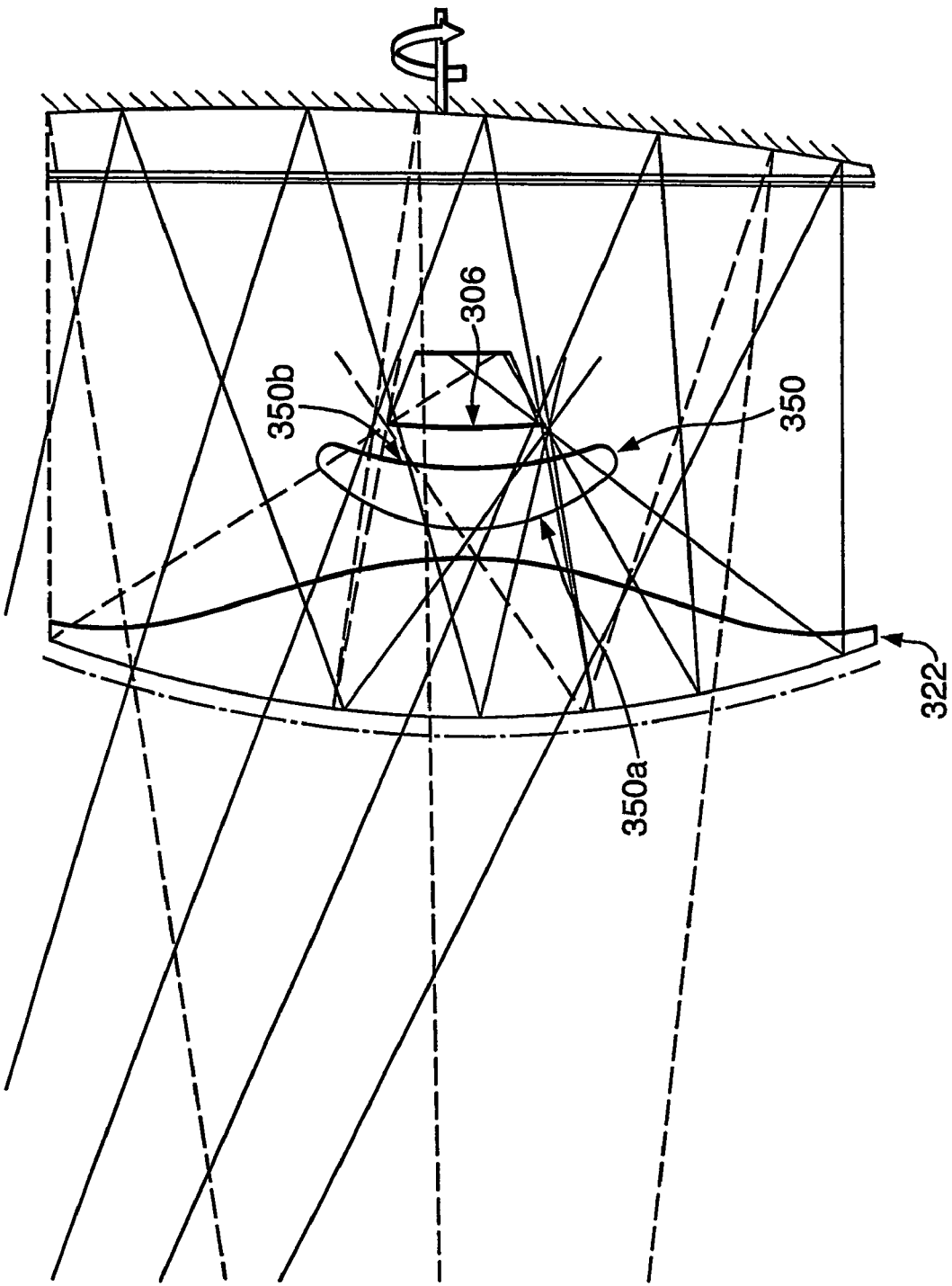
Figure 4A:
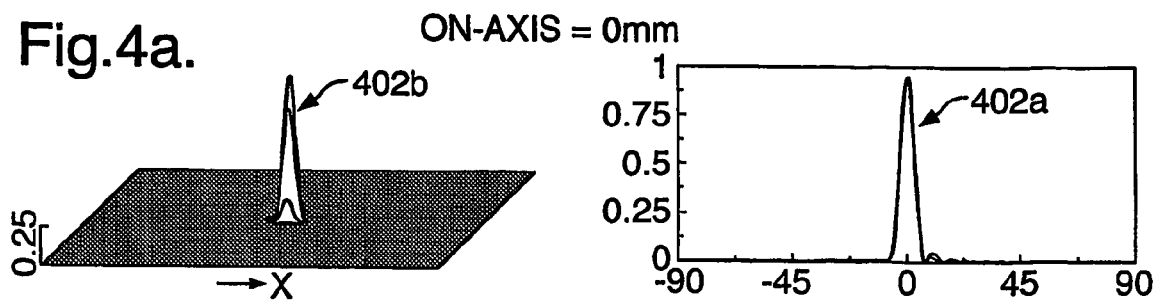
FIG. 4a shows an on optical axis point spread function 402a,b, which exhibits a normalised intensity in excess of 0.9 and a narrow peak width both of which are indicative of a high quality imaging apparatus.
Figure 4B:
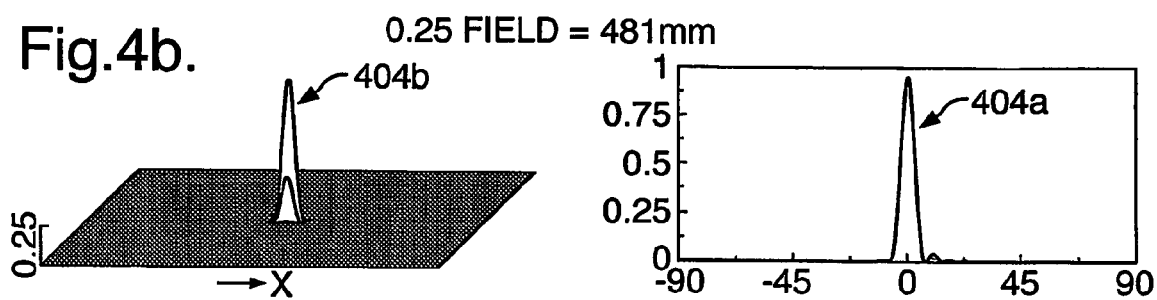
FIG. 4b shows a point spread function 404a,b at 481 mm off optical axis, corresponding to 25% of full field of the imaging apparatus., which exhibits a normalised intensity in excess of 0.9 and a narrow peak width both of which are indicative of a high quality imaging apparatus.
Figure 4C:
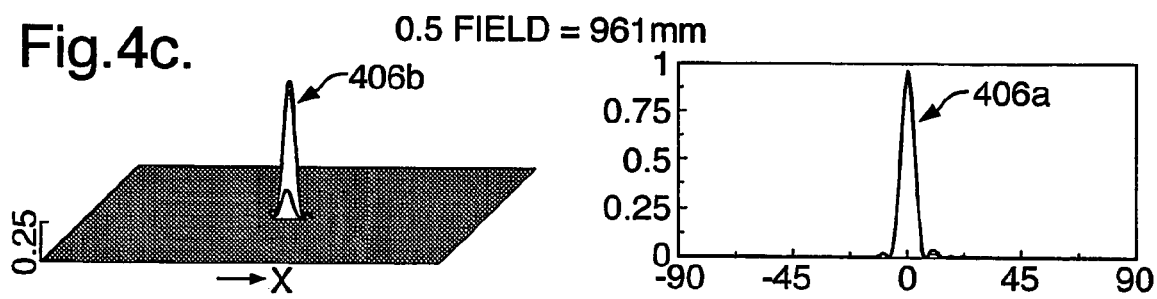
FIG. 4c shows a point spread function 406a,b at 961 mm off optical axis, corresponding to 50% of full field of the imaging apparatus, which exhibits a normalised intensity in excess of 0.9 and a narrow peak width both of which are indicative of a high quality imaging apparatus.
Figure 4D:
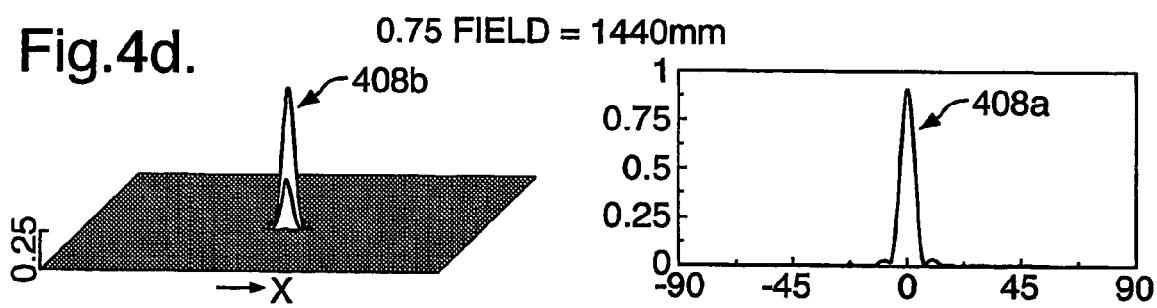
FIG. 4d shows a point spread function 408a,b at 1440 mm off optical axis, corresponding to 75% of full field of the imaging apparatus, which exhibits a normalised intensity in excess of 0.9 and a narrow peak width both of which are indicative of a high quality imaging apparatus.
Figure 4E:
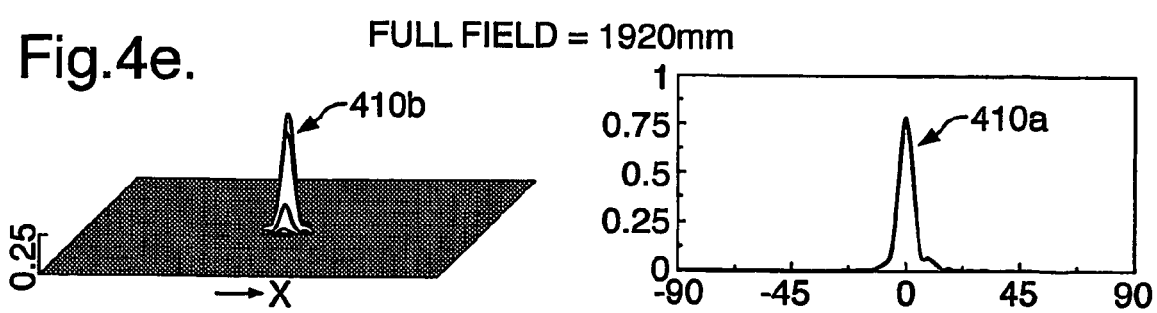
FIG. 4e shows a point spread function 410a,b at 1920 mm off optical axis, full field of the imaging apparatus, which exhibits a normalised intensity in excess of 0.8 and a narrow peak width, both of which are indicative of a high quality imaging apparatus.

Thus, high quality images are achievable using an imaging apparatus according to the present invention at fields of view that are up to 50% larger than those achievable using current imaging apparatus, such as the prior art apparatus detailed in FIG. 1 and so is shown to be especially suitable for mm wave imagers.

It will be appreciated that although described with reference to millimeter wave scanning imagers the present invention has wider application in the field of radiation detection apparatus and should not be limited to any particular wavelength or detection arrangement.

The invention claimed is:

1. A passive millimeter wave (MMW) radiation detection apparatus comprising:
   a radiation detector; and
   a lens arrangement, the lens arrangement comprising:
      a polarising element; and
      an optical corrector, the polarising element being arranged to selectively transmit radiation of a first polarisation and to focus and selectively reflect radiation of a second polarisation, and the optical corrector having first and second curved surfaces, wherein said second surfaces is shaped to correct aberrations present in the lens arrangement, said first surface comprising a convex surface, wherein said optical corrector is arranged to support the polarising element upon said first convex surface thereof, wherein said first convex surface is conformal with said polarizing element.

2. A radiation detection apparatus as claimed in claim 1 wherein the optical corrector is physically located between the polarising element and the radiation detector.

3. A radiation detection apparatus as claimed in claim 1 wherein the optical corrector is fabricated from a material having a density of around 30 gl$^{-1}$.

4. A radiation detection apparatus as claimed in claim 1 wherein the optical corrector is fabricated from a material having a refractive index of between 1.001 and 2.

5. A radiation detection apparatus as claimed in claim 1 wherein there is provided a further optical corrector interposed between the optical corrector and the radiation detector.

6. A radiation detection apparatus as claimed in claim 5 wherein the further optical corrector has a front surface with an elliptical cross-section and an aspherical, plane or spherical profile.

7. A radiation detection apparatus as claimed in claim 5 wherein the further optical corrector has a rear surface with a different profile to the profile of the front surface.

8. A radiation detection apparatus as claimed in claim 5 wherein the further optical corrector is fabricated from a plastic material.

9. A radiation detection apparatus as claimed in claim 5 wherein the further optical corrector is fabricated from a plastics foam material.

10. A radiation detection apparatus as claimed in claim 1 wherein the radiation detector is an imaging radiation detector.

11. A radiation detection apparatus as claimed in claim 1 wherein the polarising element is arranged to focus radiation having the second polarisation.

* * * * *